US010837603B2

(12) United States Patent
Despres et al.

(10) Patent No.: US 10,837,603 B2
(45) Date of Patent: Nov. 17, 2020

(54) GAS SUPPLY VESSEL

(71) Applicant: ENTEGRIS, INC., Billerica, MA (US)

(72) Inventors: Joseph Robert Despres, Middletown, CT (US); Edgar Daniel La Borde, Danbury, CT (US); Robert Zeller, Boston, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 16/280,520

(22) Filed: Feb. 20, 2019

(65) Prior Publication Data
US 2019/0277452 A1 Sep. 12, 2019

Related U.S. Application Data

(60) Provisional application No. 62/639,462, filed on Mar. 6, 2018.

(51) Int. Cl.
F17C 11/00 (2006.01)
B01J 20/22 (2006.01)
B01J 20/26 (2006.01)
B01J 20/20 (2006.01)
F17C 13/04 (2006.01)

(52) U.S. Cl.
CPC ............ F17C 11/00 (2013.01); B01J 20/20 (2013.01); B01J 20/226 (2013.01); B01J 20/26 (2013.01); F17C 13/04 (2013.01); F17C 2201/0109 (2013.01); F17C 2205/0323 (2013.01); F17C 2205/0341 (2013.01); F17C 2205/0344 (2013.01); F17C 2205/0391 (2013.01); F17C 2205/0394 (2013.01); F17C 2270/0518 (2013.01)

(58) Field of Classification Search
CPC .............. F17C 11/00; F17C 2205/0344; F17C 11/005; F17C 11/007; F17C 2205/0341; F17C 2205/0391; F17C 2205/0388; F17C 2205/0394

See application file for complete search history.

(56) References Cited

U.S. PATENT DOCUMENTS

| 5,409,526 | A | 4/1995 | Zheng et al. |
| 5,456,740 | A | 10/1995 | Snow |
| 5,487,771 | A | 1/1996 | Zeller |
| 5,814,272 | A | 9/1998 | Zeller |
| 6,368,648 | B1 | 4/2002 | Bertram et al. |
| 6,503,584 | B1 | 1/2003 | McAlister |
| 6,964,817 | B2 | 11/2005 | Date |

(Continued)

FOREIGN PATENT DOCUMENTS

| CN | 1705846 A | 12/2005 |
| CN | 201407481 Y | 2/2010 |

(Continued)

Primary Examiner — J C Jacyna
(74) Attorney, Agent, or Firm — Entegris, Inc.

(57) ABSTRACT

A gas supply vessel for storing and dispensing a reagent gas including a filter such that the vessel is capable of delivering the reagent gas, after it is filtered, at a high level of purity. The filter includes a porous sintered body and is effective to provide a desired level of purity of a supplied reagent gas by flowing the reagent gas through the filter during delivery from the vessel at a low pressure, at a relatively low flow rate, and with a relatively low pressure drop across the filter.

6 Claims, 1 Drawing Sheet

(56) References Cited

U.S. PATENT DOCUMENTS

| | | | |
|---|---|---|---|
| 7,195,735 | B2 | 3/2007 | Date |
| 7,241,331 | B2 | 7/2007 | Wu |
| 8,673,065 | B2 | 3/2014 | Burgess |
| 2002/0192126 | A1 | 12/2002 | Hertzler |
| 2004/0107838 | A1 | 6/2004 | Carruthers |
| 2008/0203101 | A1 | 8/2008 | Kimbara |
| 2008/0257755 | A1* | 10/2008 | Yoshida ............... B65D 83/38 206/0.7 |
| 2012/0079940 | A1 | 4/2012 | Zeller |
| 2013/0220479 | A1 | 8/2013 | Luo |
| 2013/0305673 | A1* | 11/2013 | Zeller ............... B01D 39/2034 55/523 |
| 2015/0090611 | A1 | 4/2015 | Dolan |
| 2015/0247605 | A1* | 9/2015 | Despres ............... F17C 13/12 222/1 |
| 2017/0122496 | A1* | 5/2017 | Scannell ............... F17C 13/04 |

FOREIGN PATENT DOCUMENTS

| | | | |
|---|---|---|---|
| TW | 201604468 | A | 2/2016 |
| TW | 201641872 | A | 12/2016 |
| WO | 0124908 | A1 | 4/2001 |
| WO | 2008008897 | A2 | 1/2008 |
| WO | 2011159259 | A1 | 12/2011 |
| WO | 2014047522 | A1 | 3/2014 |
| WO | WO2015/191929 | * | 12/2015 ............... F17C 13/04 |

\* cited by examiner

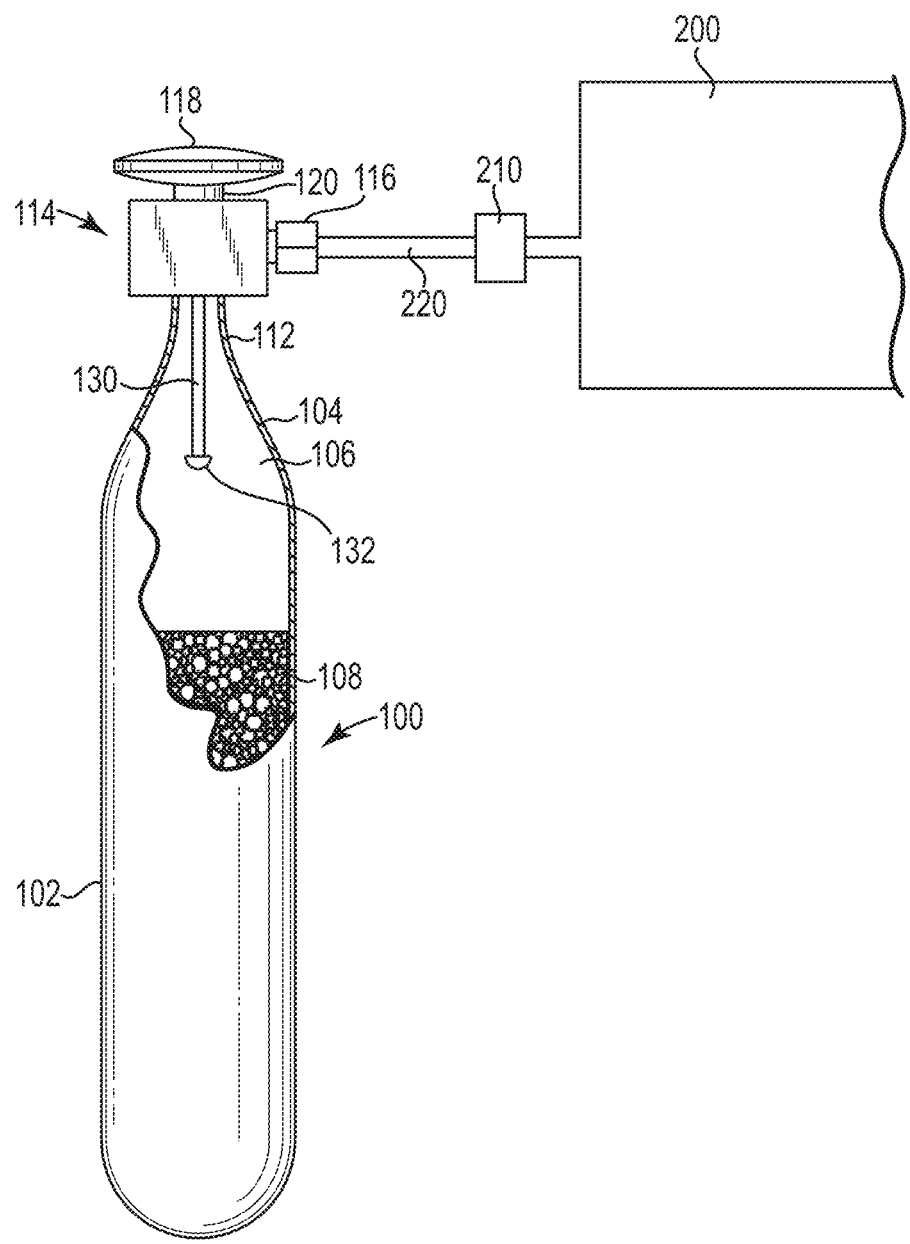

GAS SUPPLY VESSEL

CROSS-REFERENCE TO RELATED APPLICATION

This application claims the benefit under 35 USC 119 of U.S. Provisional Patent Application No. 62/639,462, filed Mar. 6, 2018, the disclosure of which is hereby incorporated herein by reference in its entirety for all purposes.

TECHNICAL FIELD

The described disclosure relates to technologies in the field of industrial reagent gases contained in vessels including an internal filter, and more particularly, in adsorbent-based vessels including an internal filter, as well as to methods of using such a vessel and such reagent gases in an application that requires high purity of the reagent gas.

BACKGROUND

Various packages or vessels are generally known and useful for containing, storing, transporting, and delivering reagent gases for use in a wide range of industrial applications. Different uses for a reagent gas can have different requirements for a supply of the reagent gas, such as a more or less stringent required level of purity. Reagent gases supplied for use in ion implantation methods require a high level of purity but that level may be lower than a required purity level of a reagent gas supplied for use in a process that involves a plasma produced by the reagent gas, e.g., a plasma deposition process.

High levels of purity of a reagent gas may be provided by the use of a filter to remove sub-micron-sized particles from a reagent gas during delivery. A level of purity of a filtered fluid is sometimes referred to based on a measure of removal efficiency of the filter, in terms of "log reduction value" or LRV. A log reduction value is a measure of filtration efficiency at a specified flow rate (or gas velocity), for a specified particle size. An LRV value of 1 means that 90% of contaminants (of a given size) are retained by the filter. LRV of 2 means that 99% of contaminants (of a given size) are retained by the filter. LRV of 3 means that 99.9% of the contaminants (of a given size) are retained by the filter, etc. The relevant particle size used in a measurement may be a size identified as a "most penetration particle size" (MPPS), which, for reagent gases used in semiconductor processing, is typically on a micron or a sub-micron scale, such as 30 microns or 0.060 microns. A particle size used in a test can be selected based on a type of reagent gas, flow rate, or another variable of the test or tested filter and reagent gas system. The methodology and techniques for determining the MPPS for filters is described in K. W. Lee & B. Y. H. Liu, "On the Minimum Efficiency and the Most Penetrating Particle Size for Fibrous Filters," Journal of the Air Pollution Control Association Vol. 30, Iss. 4, 1980.

As products made of semiconductor materials become continually faster and smaller, processes and raw materials used to semiconductor materials and derivative devices must also continually improve. This includes a need for improvements in supplies of reagent gases, including improvements in the purity of reagent gases supplied for commercial uses, including semiconductor processing and microelectronic device manufacturing.

SUMMARY

The present disclosure relates to storage vessels that are useful to contain, transport, store, handle, and deliver industrially useful reagent gases. In some embodiments, the vessel is an adsorbent-based vessel, meaning that the vessel contains adsorbent that has an affinity for the reagent gas, and contains the reagent gas within the vessel as adsorbed reagent gas present in adsorbed form at surfaces of the adsorbent in equilibrium with gaseous reagent gas that is in a vapor (gaseous) form. The vessel contains the reagent gas and allows for delivery of the reagent gas at sub-atmospheric pressure (or approximately sub-atmospheric pressure). In other embodiments, the vessel is a pressure-regulated vessel.

According to the disclosure, the vessel includes a filter that is on the interior of the vessel, and the vessel is capable of delivering the reagent gas, after it is filtered, at a high level of purity. The high-purity reagent gas that is delivered from the vessel may be useful in applications that require high purity, such as various processes that are commonly used in semiconductor processing including ion implantation processes, epitaxial growth, plasma etching, reactive ion etching, metallization, physical vapor deposition, chemical vapor deposition, plasma deposition, photolithography, cleaning, and doping, among others, with these uses being part of the manufacture of semiconductor, microelectronic, photovoltaic, and flat-panel display devices and products.

Example vessels include a filter at the vessel interior, the filter including, consisting of, or consisting essentially of a porous sintered body that is effective to filter reagent gas passing through the filter during delivery of the reagent gas from the vessel at a low flow rate and under low pressure. The filter is effective to provide a desired effectiveness of filtering micron or submicron-sized particles to produce a flow of gaseous fluid reagent having a level of purity required for various industrial applications. Examples reagent gases delivered from a vessel as described can have a purity level, for micron or sub-micron scale particles (e.g., 30 microns, 10, 1, 0.1, 0.01, or 0.003 microns, or a specific MPPS), of a least a 3, 4, 5, 7, or 9 log reduction value, at a low or very low flow rate, e.g., a flow rate that is below 20, 10, 5, or 2 standard cubic centimeters per minute (sccm).

In some embodiments, the disclosure relates to a storage and dispensing vessel for storing and dispensing reagent gas. The vessel includes: an interior volume, adsorbent within the interior volume, and reagent gas within the interior volume. The reagent gas includes a portion that is adsorbed on the adsorbent, and a portion that is present as gaseous reagent gas in equilibrium with the adsorbed reagent gas. The vessel includes an outlet in communication with the interior volume, and a filter in a flow path between the interior volume and the outlet. The filter includes a porous sintered body.

Other embodiments of the disclosure relates to methods of delivering reagent gas from a vessel of the present description.

BRIEF DESCRIPTION OF THE DRAWINGS

The disclosure may be more completely understood in consideration of the following description of various illustrative embodiments in connection with the accompanying drawings FIG. 1 is a schematic illustration of a vessel as described attached to a device supplied with reagent gas from the vessel.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

The disclosure relates to gas storage and supply vessels that are useful to contain a reagent gas and to deliver the reagent gas from the vessel at a high purity level. In some embodiments, the gas storage and supply vessel can be an adsorbent-based storage vessel useful to contain a reagent gas and to deliver the reagent gas from the vessel at a high purity level. In other embodiments, the gas storage and supply vessel can be a pressure regulated gas storage and supply vessel useful to contain a reagent gas and to deliver the reagent gas from the vessel at a high purity level. As used herein, the term "pressure-regulated in reference to fluid storage and dispensing vessels means that such vessels have at least one pressure regulator device, set pressure valve, or vacuum- or pressure-activated check valve disposed in an interior volume of the vessel and/or in a valve head of the vessel, with each such pressure regulator component being adapted so that it is responsive to fluid pressure in the fluid flow path immediately downstream of the pressure regulator component, and opens to enable fluid flow at a specific downstream reduced pressure condition in relation to the higher fluid pressure upstream of the pressure regulator component, and subsequent to such opening operates to maintain the pressure of fluid discharged from the vessel at a specific, or "set point", pressure level.

According to the various embodiments described herein, a gas storage and supply vessel includes a filter disposed in an interior of the vessel such that the vessel is capable of delivering the reagent gas after it is internally filtered at a level of purity useful in various industrial applications, such as for use in semiconductor processing methods including ion implantation processes, plasma deposition processes, among others. In some cases, the internal filter precludes the use of a secondary external filter. In other words, the vessel is capable of delivering the reagent gas after it is internally filtered at a level of purity useful in various industrial applications without the need for an external filter. In some embodiments, the vessel contains the reagent gas at an interior pressure that can be sub-atmospheric, e.g., not greater than approximately atmospheric pressure, and can deliver the gas also at a sub-atmospheric pressure or a pressure that is not greater than approximately atmospheric pressure.

According to various embodiments of the disclosure, the gas storage and supply vessel is capable of storing reagent gases at sub-atmospheric pressure. Various examples of vessels for storing reagent gases at sub-atmospheric pressure are known and can be useful according to the present description. Such exemplary vessels include generally rigid sidewalls that define a vessel interior and an outlet, with the outlet typically including a valve to control flow between the interior and exterior of the vessel. The vessel sidewalls are designed to withstand a pressure that safely exceeds a desired maximum pressure recommended of a gas contained by the vessel. The interior contains adsorbent material that is capable of adsorbing reagent gas on a surface such that the reagent gas is present at the interior of the vessel in both an adsorbed form (adsorbed reagent gas, adsorbed on the adsorbent surface) and a non-adsorbed, gaseous form (gaseous reagent gas present at the vessel interior, in equilibrium with the adsorbed reagent gas).

A gas storage and supply vessel, according to the various embodiments, are capable of storing and delivering the reagent gas at low pressures, e.g., approximately atmospheric pressure (below 1000 torr, particularly below 760 torr), particularly at sub-atmospheric pressure. Over a range of temperatures that includes generally ambient temperature (e.g., at a range from about 0 to about 30 or 40 degrees Celsius), the vessel interior may be not highly pressurized and is preferably at a pressure that does not exceed about one atmosphere (absolute), preferably a pressure that is sub-atmospheric, such as at a pressure that is below 760 torr, e.g., below 500 Torr, or below 200, 100, 50, or 10 Torr (absolute). Example operating temperatures at which a vessel is used to handle, store, process, transport, or use a reagent gas, in any particular and relevant industry or application, may be approximately room temperature, e.g., 24 degrees C., e.g., in a range from about 20 to about 26 degrees Celsius, at which temperature the interior vessel pressure is preferably sub-atmospheric. Vessels and methods of the present description may, however, also be useful at higher and lower operating temperatures, as desired, for applications that use, hold, store, or process a reagent gas at a significantly higher or a significantly lower temperature.

Example vessels include an opening that selectively allows for reagent gas to be added to or removed from the vessel interior, such as a discharge port that may include a valve that can be opened and closed. Attached to the valve at the discharge port may be a flow or pressure-regulating mechanism such as a pressure valve or a flow metering device. For example, the vessel, at an opening and discharge port, may be coupled to a valve head that can be opened and closed to allow reagent gas to be dispensed from the interior of the vessel through the dispense port and valve head. To achieve a desired pressure or flow rate of the flow of reagent gas from the vessel, a pressure regulator, flow meter, or other flow-regulating device may be at the valve head external to the vessel interior. Alternately or additionally, one or more pressure regulator, flow meter, or other flow-regulating device may optionally be connected to the vessel opening but internal to the vessel, at the vessel interior. According to certain embodiments, an internal flow-regulating mechanism (pressure valve or flow meter) at an interior of the vessel is not required and may be excluded from a vessel of the present description. According to certain example embodiments of described vessels and methods, a flow-regulating mechanism may be designed to operate at a pressure that is below one atmosphere, to allow reagent gas to be removed from the vessel interior at sub-atmospheric pressure. Examples of fluid supply vessels and appurtenant items such as flow valves and pressure valves of types that may be useful in a general sense according to the present description are described, e.g., in U.S. Pat. No. 6,132,492 and in PCT Patent Publication WO 2017/008039 (PCT/US2016/041578), the entire contents of these documents being incorporated herein by reference.

Adsorbent, (a.k.a. a solid-phase physical sorbent medium) at the vessel interior can be any adsorbent that has a sorptive affinity for one or more reagent gases. The adsorbent can be useful for selectively, e.g., reversibly, adsorbing and desorbing reagent gas onto the adsorbent to allow the reagent gas to be: first delivered into the vessel in a manner to cause the reagent gas to adsorb onto the adsorbent; then to allow the adsorbed reagent gas (in equilibrium with an amount of desorbed, gaseous, reagent gas also at the vessel interior) to be stored within the closed vessel interior at approximately atmospheric pressure, preferably at sub-atmospheric pressure; and eventually to allow the reagent gas to be desorbed (e.g., under vacuum) from the adsorbent and removed from the vessel through an opening in the vessel as gaseous reagent gas, preferably still at approximately atmospheric pressure, e.g., at sub-atmospheric pressure.

The adsorbent may be any presently-known or future-developed adsorbent material, and a particular adsorbent of a vessel may depend on factors such as the type and amount of reagent gas to be contained in the vessel, the volume of the vessel, the desired pressure of the adsorbent supplied by or contained in the vessel, and other factors. Various adsorbent materials are known in the reagent gas and reagent gas storage arts, and will be understood to be useful as an adsorbent in a vessel as described. Certain examples of adsorbent materials are mentioned in U.S. Pat. No. 5,704,967 (the entirety of which is incorporated herein by reference), U.S. Pat. No. 6,132,492 (mentioned previously) and in PCT patent publication WO 2017/008039 (also mentioned previously).

Non-limiting examples of adsorbent materials that are known and that may be suitable for use in a vessel as described herein include: polymeric adsorbents such as microporous TEFLON, macroreticulate polymers, glassy domain polymers; aluminum phosphosilicate (ALPOS); clays; zeolites; metal-organic frameworks (MOFs); porous silicon; honeycomb matrix materials; activated carbon and other carbon materials; and other similar materials. Some examples of carbon adsorbent materials include: carbon formed by pyrolysis of synthetic hydrocarbon resins such as polyacrylonitrile, sulfonated polystyrene-divinylbenzene, etc.; cellulosic char; charcoal; activated carbon formed from natural source materials such as coconut shells, pitch, wood, petroleum, coal, etc.

An exemplary vessel as described may be substantially filled with a bed of suitable adsorbent material. The adsorbent may be in any shape, form, size, etc., to efficiently and reversibly adsorb reagent gas onto the adsorbent for storage in the vessel at sub-atmospheric pressure. The size, shape, and other physical properties of an adsorbent (e.g., porosity) can affect the capacity of the adsorbent to adsorb reagent gas, as well as the packing density and void (interstitial space) volume of the adsorbent. These factors can be selected based on a balance of factors of a storage vessel system including the type of reagent gas, the type of adsorbent, operating temperature and pressure of the vessel, among others. The adsorbent material may have any suitable size, shape, porosity, range of sizes, and size distribution. Examples of useful shapes and forms include beads, granules, pellets, tablets, shells, saddles, powders, irregularly-shaped particulates, pressed monoliths, extrudates of any shape and size, cloth or web form materials, honeycomb matrix monolith, and composites (of the adsorbent with other components), as well as comminuted or crushed forms of the foregoing types of adsorbent materials.

The vessel includes a filter located at an interior of the vessel along with the adsorbent, and in a flow path that leads from the vessel interior to a vessel outlet. The filter is one that removes particulate matter, including micron-scale or sub-micron-scale particulates, from reagent gas as the reagent gas passes from the vessel interior to an exterior, e.g., through an outlet that may include a valve. The vessel can contain and deliver any of a variety of reagent gases used in industrial applications, with the reagent gas being delivered at a desirably high purity level as required for various industrial uses of reagent gases.

Examples of uses of reagent gases at high purity levels include: ion implantation, epitaxial growth, plasma etching, reactive ion etching, metallization, physical vapor deposition, chemical vapor deposition, plasma deposition, photolithography, cleaning, and doping, with these uses being part of the manufacture of semiconductor, microelectronic, photovoltaic, and flat-panel display devices and products. Certain uses of reagent gases can require particularly high levels of purity, for example methods of plasma deposition. According to the present disclosure, vessels that contain an internal filter can be used to store reagent gases for any of these purposes, and deliver a reagent gas at a required purity level, including for purposes that require especially high purity reagent gases, such as plasma deposition methods.

According to various embodiments, a vessel, as described herein, includes a filter. The filter is capable of being positioned in an interior of the vessel, and at a position that places the filter in a flow path between the vessel interior and an exterior of the vessel. More particularly, the filter is disposed in the flow path at the valve inlet. Alternatively, the filter is disposed in the filter path between the valve seat and the valve outlet. The filter can be installed onto the valve inlet by a threaded connection or, in some cases, it can be stub welded on to the valve inlet. The filter does not require a filter housing or a shell. The filter is preferably of a relatively small size and of a convenient shape for being contained in the vessel interior, while still being effective to provide a desired level of purity of a supplied reagent gas by flowing the reagent gas through the filter during delivery from the vessel at a low pressure, at a relatively low flow rate, and with a relatively low pressure drop across the filter.

Examples of useful filters include filters that comprise, consist of, or consist essentially of a porous metal sintered body (also sometimes referred to as a porous sintered body). Examples of porous sintered bodies that can be effective for filtering a reagent gas, when positioned in an interior of a vessel, can have a relatively thin profile (a small thickness), a high porosity, and can be formed into a desired shape for placing internal to a vessel and in a path of flow of reagent gas. Examples of useful shapes include forms of a sheet-like membrane that may be planar or a three-dimensionally rounded shape such as, for example, a cup, cone, cylinder, tube, or closed-end tube, but not limited to these. The porous sintered body may exhibit a combination of physical properties consistent with its used as described herein, such as a desired combination of thickness, porosity, surface area (BET), and frontal area.

As a general matter, a porous sintered body for use as a filter in an interior of a vessel as described can be highly porous with a relatively thin profile (i.e., a small thickness), while still being effective to perform a filtration function at a desired removal efficiency for a flow of reagent gas at a useful flow rate and pressure. A relatively thin filter body can be preferred due to a relatively lower pressure drop that will occur across the body during filtering as compared to a pressure drop of a filter having a greater thickness that is otherwise similar. Pressure drop is directly proportional to thickness of the filter body. A higher porosity sintered body is preferred over a lower porosity sintered body (given comparable removal efficiency), because pressure drop is also exponentially proportional to porosity.

In more detail, a porous sintered body for use as a filter membrane, as described, can be relatively thin, e.g., have a thickness that is relatively small in magnitude, for example to allow for flow through the filter at a relatively low pressure drop. Examples of useful or preferred porous sintered bodies can have a thickness (the dimension that is in a direction of flow of reagent gas through the filter membrane during use) that is below 3 millimeters, e.g., below 2 millimeters, or below 1 millimeter, such as in a range from about 0.2 to about 1.5 or 1.7 millimeters.

A porous sintered body as described may have any porosity that will allow the porous sintered body to be effective as described herein, for filtering a flow of reagent gas at a low flow rate at a low pressure as described, with a low pressure drop. Example porous sintered bodies can have a relatively high porosity, for example a porosity of at least 70 percent, e.g., a porosity in a range from 55 to 70 percent, more particularly from 55 to 65 percent, and even more particularly from 550 to 60 percent. As used herein, and in the art of porous sintered bodies, a "porosity" of a porous sintered body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

The porous sintered body can have any surface area that will allow the sintered body to be effective for use as a filter as described, e.g., to filter a flow of reagent gas at a low flow rate, with a low pressure drop, at a pressure that is approximately atmospheric pressure or that is sub-atmospheric, and with filtering efficiency as described herein. As is known in the porous body arts, surface area (BET) refers to a surface area of a porous body per mass of the body, calculated using the theory defined by Brunauer, Emmett and Teller, which involves physical adsorption of gas molecules on a solid surface. Without being a limit on the presently-described porous bodies, presently preferred surface area (BET) of a porous sintered body as described can be in a range from 0.15 to 0.60 meters squared per gram, in a range from 0.15 to 0.50 meters squared per gram, and more particularly from 0.15 to 0.25 meters squared per gram. Surface area (BET) values that differ from these ranges may also be useful depending on: other structural features of a particular porous sintered body; features of a gaseous flow being filtered; and desired particle removal efficiency (as measured by LRV).

A filter membrane made of a porous sintered body as described can include a useful frontal area, which refers to an area of the filter membrane through which a flow of reagent gas passes during delivery of reagent gas from the vessel. A frontal area of a filter may be sufficiently high to allow for other performance features as described, including a low pressure drop as described, a low flow rate (per area) of fluid through the filter, and a desired removal efficiency (as measured by LRV). Exemplary porous sintered bodies can be constructed into a filter membrane that is in the form of a flat sheet, or alternately as a three-dimensional shape such as in the form of a cup, cone, cylinder, tube, or closed-end tube. One example of a useful filter body can include a form of a cylinder having a length in a range from 2 to 5 centimeters (e.g., from 3 to 4.5 centimeters), an outer diameter in a range from 0.5 to 1.1 centimeters (e.g., from 0.7 to 1.0 centimeter), an inner diameter in a range from 0.3 to 0.8 centimeters (e.g., from 0.4 to 0.7 centimeters), and a thickness in a range from 0.6 to 1.4 millimeter, e.g., from 0.8 to 1.2 millimeter.

Various examples of porous sintered bodies have previously been described generally, and for use in filter applications. See, for example, U.S. Pat. Nos. 5,814,272, 6,964, 817 7,195,735, 8,673,065, and United States Patent Publications 2012/0079940 and 2013/0305673, the entireties of each of these documents being incorporated herein by reference. Examples of porous sintered bodies as described herein can be prepared by methods and from materials that include methods and materials identified in these documents.

Very generally, a porous sintered body can be prepared by preparing a blend of metal powder particles and sintering the blend of metal particles, optionally in a mold, to form a porous sintered body. Properties of the particles can be selected to achieve desired properties of the sintered body such as porosity, surface area, etc. Sintering refers to a process of heating a collection of—the particles, while surfaces of the particles contact each other, to a temperature and for a time that allows the particles to mechanically bond together by agglomeration, but without the particles becoming liquefied. Optionally, other non-metal materials may be used in combination with the metal powder particles, e.g., for processing, such as an organic binder.

In somewhat more detail, the metal powder particles can be selected to provide desired properties in a sintered body, such as strength (e.g., rigidity), porosity, and surface area. Examples of compositions and properties of metal particles that can be useful to form a porous sintered body as described are described in the above-identified US patent documents. Specific examples include highly anisotropic dentritic metal particles that contain a metal or metal alloy such as platinum, chromium, nickel, or an alloy thereof such as a stainless steel alloy (see U.S. Pat. No. 5,814,272).

In use, an amount of reagent gas that is delivered from a vessel and that flows through the internal filter can be an amount that is desired for use in a particular process (e.g., by use in a particular semiconductor processing apparatus or process) while also providing desired effectiveness (e.g., particle retention) of the internal filter. For various applications in filtering a reagent gas for use in processing a semiconductor or derivative product (e.g., microelectronic device or a precursor thereof), a flow of fluid (as expressed in volume of flow per time) through the filter can be below about 20 or 10 standard cubic centimeters per minute (sccm), e.g., below 5, 2, 1, or 0.5 sccm.

During delivery of the reagent gas from the vessel, the reagent gas flowing through the filter can preferably have a relatively low pressure drop, based on factors that include a relatively low flow rate, a desirably high porosity of the filter, and a desirably small thickness of the filter. A pressure differential (or "pressure drop") across a thickness of a filter as described (between an upstream side of the filter and a downstream side of the filter), during use of the filter, can be any pressure differential that allows for desired effectiveness (e.g., particle retention) during filtering (e.g., of a given flow rate of fluid), and that is also commercially feasible. Using relatively low flow rates of reagent gas, with a highly porous filter having a low thickness, a preferred method of the present description can result in a relatively low pressure differential. For various applications of filtering and delivering a reagent gas for use in processing a semiconductor or microelectronic device, a pressure differential across the filter membrane can be below about 100 torr (differential) preferably below about 50, 30, 20, 10, or below about 5 torr (differential), while still allowing for a useful flow of the fluid through the filter.

The temperature of a flow of reagent gas through the filter during deliver can be any temperature that allows for commercially effective filtering and effective use of the reagent gas. For various applications of filtering a chemical reagent gas for use in processing a semiconductor or microelectronic device, a temperature may be about room temperature (e.g., 30 degrees Celsius), or higher, for example a temperature of at least 100, 150, or 200 degrees Celsius.

Example filters as described, comprising, consisting essentially of, or consisting of a porous sintered body can be effective to provide a desired level of filtering of micron or submicron-sized particles at a level of purity required for various industrial applications, including for use in providing reagent gas to processes for semiconductor manufacturing such as for ion implantation and plasma deposition. The filters, as described herein, are capable of delivering reagent gases delivered from the vessel at high purity levels for micron or sub-micron scale particles (e.g., 30 microns, 10, 1, 0.1, 0.01, or 0.003 microns, or specific (MPPS)), at a purity level of at least a 3, 4, 5, 7, or 9 log reduction value, at a low or very low flow rate, such as, for example, a flow rate that is at or below 20, 10, 5, 2, 1, or 0.5 standard cubic centimeters per minute (sccm). As previously described herein, a log reduction value is a measure of filtration efficiency at a specified flow rate (or gas velocity), for a specified particle size. The methodology and techniques for determining the most penetration particle size or MPPS for filters is described in K. W. Lee & B. Y. H. Liu, "On the Minimum Efficiency and the Most Penetrating Particle Size for Fibrous Filters," Journal of the Air Pollution Control Association Vol. 30, Iss. 4, 1980.

A reagent gas that can be contained by the vessel can be any type of reagent gas useful in an industrial process. Many examples are hazardous reagent gases that are known to be noxious, poisonous, or otherwise a safety risk. Toxic and other hazardous specialty gases are used in a number of industrial applications, such as for uses that include: ion implantation, epitaxial growth, plasma etching, reactive ion etching, metallization, physical vapor deposition, plasma deposition chemical vapor deposition, photolithography, cleaning, and doping, with these uses being part of the manufacture of semiconductor, microelectronic, photovoltaic, and flat-panel display devices and products. Still, the use of a vessel or method as described can be applied to reagent gases used or useful in other applications and in other industries, in particular for reagent gases that may be desirable provided at high levels of purity.

Non-limiting examples of reagent gases that can be conveniently and usefully contained in and supplied, with filtering, by a vessel as described, which are hazardous, noxious, or otherwise dangerous, include: silane, methyl silane, trimethyl silane, hydrogen, methane, nitrogen, carbon monoxide, diborane, BP3, arsine, phosphine, phosgene, chlorine, BCl3, BF3, B2D6, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, trimethyl stibine, halide (chlorine, bromine, iodine, and fluorine), gaseous compounds such as NF3, ClF3, GeF4, SiF4, AsF5, AsH3, PH3, organo compounds, organometallic compounds, hydrocarbons, and organometallic Group V compounds such as (CH3)3Sb. For each of these compounds, all isotopes are contemplated.

FIG. 1 illustrates exemplary storage and dispensing system 100, and processing equipment 200. Processing equipment 200 may be any useful type of equipment, such as a system for processing a semiconductor or microelectronic device, e.g., an ion implantation apparatus, a plasma deposition apparatus, or a plasma generator. System 100 can supply reagent gas from vessel 102, through conduit 220, to equipment 200. Optionally, a flow metering device, pressure valve, or pressure regulating device 210 may be provides with conduit 220 to affect, control, or measure a flow of reagent gas from system 100 to equipment 200.

In the embodiment exemplified by FIG. 1, storage and dispensing system 100 includes vessel 102 that contains adsorbent material 108 within interior 106 of the vessel. However, it will be generally understood that in some alternative embodiments the vessel 102 can be a pressure regulated vessel such as the VAC® vacuum actuated cylinder manufactured and sold by Entegris, Inc. of Billerica, Mass. As shown in FIG. 1, sidewalls 104 define the interior space relative to an exterior. Upper end 112 includes an opening with valve assembly 114, which includes threaded coupling 116, valve 120, and knob 118 to open and close valve 120 to allow for movement of reagent gas between the interior and exterior of vessel 102.

Gaseous reagent gas (not specifically numbered) is present as a gaseous reagent in interior 106, and is in equilibrium with adsorbed reagent gas that is physically adsorbed to surfaces of adsorbent material 108. Hollow conduit 130 connects valve 120 to filter 132, to provide a closed flow path for reagent gas between interior 106, through filter 132, and to valve 120 for dispensing from vessel 102. Filter 132 is as described herein, comprising, consisting essentially of, or consisting of a sintered body as described. Conduit 130 is closed along a length and includes a first opening at an end at valve 120 and a second opening at a second end at filter 132. To pass from interior 106 to an exterior of the vessel, reagent gas must pass through filter 132, as well as conduit 130, and valve 120.

Filter 132 may, for example, have the specifications listed in Table below:

TABLE 1

| Gas service | UHP toxic and corrosive gas |
|---|---|
| Filtration Grade | UHP sub micron |
| Material | SS 316L |
| Outer diameter | 0.2 to 0.5 in |
| Inner diameter | 0.2 to 0.4 in |
| Length | 1 to 2 in |
| Max Temperature rating | 400 degrees C. |
| Flow | >5 SLPM (standard liters per minute, air) at 2 psid |

In use, reagent gas (e.g., the gaseous reagent gas and the adsorbed reagent gas) can be removed from exemplary vessel 102 by pressure differential desorption, meaning by connecting coupling 116 to a source of reduced pressure to cause gaseous reagent gas to flow through valve assembly 114 to a location external to interior 106. The contained reagent gas can be any reagent gas, especially a hazardous reagent gas, that is used or useful in any industry, especially in the manufacture of semiconductor, microelectronic, photovoltaic, or flat-panel display devices and products.

System 100 may be connected to any system or equipment (200) that uses the reagent gas as a raw material for processing a semiconductor device or material, a microelectronic device, a photovoltaic device, a flat-panel display device, or a component or precursor thereof, e.g., a system, device, or tool used for: ion implantation, epitaxial growth, plasma etching, reactive ion etching, metallization, physical vapor deposition, chemical vapor deposition, photolithography, cleaning, or doping.

According to particular example methods of use for a vessel as described, the vessel can contain a reagent gas useful in a plasma deposition method, and equipment 200 can be equipment for performing plasma deposition, including a plasma generator. A plasma deposition method generally refers to a process that involves the use of a plasma to effect surface modification of a substrate or thin film deposition of a material onto a substrate surface. According to exemplary plasma deposition techniques, a plasma generator is used to prepare plasma ions. Per the present description, the plasma generator may be supplied with reagent gas from a vessel as described, for generating the plasma. In example methods, reagent gas supplied by a vessel of the disclosure (e.g., as illustrated at FIG. 1) can supply reagent gas to a plasma deposition process, for example may deliver the reagent gas to a plasma generator (e.g., equipment 200 of FIG. 1). Also according to example methods, the plasma that is produced by the plasma generator is directed, e.g., using ion extraction and acceleration, to a reaction chamber (a.k.a. plasma reactor) that contains a substrate (target). The substrate (target) is exposed to the plasma, and the substrate is biased (such as electrically) to cause ionic components of the plasma to become deposited onto the surface of the substrate. Examples of substrates include silicon wafers and in-process microelectronic devices.

Specific examples of plasma deposition methods include techniques sometimes referred to as plasma-based ion implantation (PBII), plasma-based ion implantation and deposition (PBIID) techniques, plasma immersion doping, plasma assisted doping, among others, plasma source ion implantation (PSII), plasma immersion ion implantation (PIII), plasma ion implantation (PII), plasma ion plating (PIP), among others.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A gas supply vessel for storing and dispensing a reagent gas, the vessel comprising:
    vessel walls defining an interior volume having an interior pressure that is sub-atmospheric;
    adsorbent within the interior volume defined by the vessel walls;
    reagent gas contained within the interior volume, the reagent gas comprising a portion that is adsorbed on the adsorbent, and a portion that is present as gaseous reagent gas in equilibrium with the adsorbed reagent gas;
    at least one valve in communication with the interior volume having an valve inlet and a valve outlet;
    an outlet in communication with the interior volume; and
    a filter secured to the valve inlet, the filter comprising a porous sintered body, the porous sintered body having a porosity ranging from 55 to 70 percent and a thickness in a direction of fluid flow of less than 3 millimeters, wherein the filter has a log reduction value of at least 4 at a particular MPPS, at a flow rate of 20 standard cubic centimeters per minute, and provides a pressure differential of less than 100 torr.

2. The vessel of claim 1, wherein the filter has a log reduction value of at least 7 at a particular MPPS at a flow rate of 10 standard cubic centimeters per minute.

3. The vessel of claim 1 wherein the porous sintered body has a thickness in a range from 0.8 to 1.2 millimeters.

4. The vessel of claim 1 wherein the porous sintered body has a surface area (BET) in a range from 0.15 to 0.30 meters per square gram.

5. The vessel of claim 1 wherein the adsorbent is selected from a metal organic framework, porous organic polymer, and activated carbon.

6. A method of supplying a reagent gas from a vessel as recited by claim 1, the method comprising delivering the reagent gas from the vessel.

* * * * *